United States Patent
Giese et al.

(10) Patent No.: US 9,577,903 B2
(45) Date of Patent: Feb. 21, 2017

(54) MONITORING ACTIVITY ON A COMPUTER

(71) Applicant: Microsoft Corporation, Redmond, WA (US)

(72) Inventors: Robin Giese, Mercer Island, WA (US); Shannon Pahl, Bellevue, WA (US); Brad Marrs, North Bend, WA (US); Nitin Choubey, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 71 days.

(21) Appl. No.: 14/447,218

(22) Filed: Jul. 30, 2014

(65) Prior Publication Data

US 2014/0365649 A1    Dec. 11, 2014

Related U.S. Application Data

(63) Continuation of application No. 12/336,868, filed on Dec. 17, 2008, now Pat. No. 8,868,722.

(51) Int. Cl.
*G06F 15/173* (2006.01)
*H04L 12/26* (2006.01)
(Continued)

(52) U.S. Cl.
CPC .......... *H04L 43/08* (2013.01); *G06F 11/3409* (2013.01); *G06F 11/3466* (2013.01);
(Continued)

(58) Field of Classification Search
CPC ... H04L 41/0681; H04L 43/08; H04L 43/0876
See application file for complete search history.

(56) References Cited

U.S. PATENT DOCUMENTS 6,055,493 A    4/2000  Ries et al.
6,629,267 B1   9/2003  Glerum et al.
(Continued)

FOREIGN PATENT DOCUMENTS

WO    2007113573 A2    10/2007

OTHER PUBLICATIONS

"A Lightweight Method for Generating Statistical Application and System Usage Information by Leveraging Any Event Tracing Mechanism," http://www.priorartdatabase.com/IPCOM/000171322/, 2004, downloaded Oct. 14, 2008.
"Event Tracing," http://msdn.microsoft.com/en-us/library/aa363787(VS.95).aspx, 2008, downloaded Oct. 14, 2008.
U.S. Appl. No. 12/336,868, filed Dec. 17, 2008, Giese.

*Primary Examiner* — Hitesh Patel
(74) *Attorney, Agent, or Firm* — Dan Choi; John Jardine; Micky Minhas

(57) ABSTRACT

A mechanism of monitoring activity on a computer which may be applied to measuring the performance of the computer. The computer is configured to track a first set of information relating to at least a first occurrence of at least one scenario on the computer. At least some of the first set of information is evaluated to make a determination about the first occurrence of the scenario. Based on that determination, the computer may be configured to track a second set of information relating to at least a second occurrence of the scenario on the computer, in which the second set of information includes at least some types of information not tracked in the first set of information. The second set of information can then be evaluated.

17 Claims, 5 Drawing Sheets

(51) Int. Cl.
*G06F 11/34* (2006.01)
*G06F 11/36* (2006.01)

(52) U.S. Cl.
CPC .......... *G06F 11/3476* (2013.01); *G06F 11/36* (2013.01); *G06F 11/362* (2013.01); *G06F 11/368* (2013.01); *G06F 11/3636* (2013.01); *G06F 11/3672* (2013.01); *G06F 2201/81* (2013.01); *G06F 2201/86* (2013.01); *G06F 2201/875* (2013.01)

(56) References Cited

U.S. PATENT DOCUMENTS

| | | |
|---|---|---|
| 6,697,969 B1 * | 2/2004 | Merriam .......................... 714/46 |
| 7,062,681 B2 | 6/2006 | Larsson et al. |
| 7,412,708 B1 | 8/2008 | Khan et al. |
| 7,886,200 B1 | 2/2011 | Hernacki et al. |
| 2002/0063735 A1 * | 5/2002 | Tamir et al. .................. 345/745 |
| 2002/0087949 A1 | 7/2002 | Golender et al. |
| 2002/0103664 A1 | 8/2002 | Olsson et al. |
| 2002/0174134 A1 * | 11/2002 | Goykhman ............ G06Q 10/06 |
| 2005/0021748 A1 | 1/2005 | Garcea et al. |
| 2005/0182750 A1 | 8/2005 | Krishna et al. |
| 2006/0184410 A1 | 8/2006 | Ramamurthy et al. |
| 2007/0240118 A1 | 10/2007 | Keren |
| 2008/0313504 A1 * | 12/2008 | Wedel ................. G06F 11/3636 714/45 |

* cited by examiner

MONITORING ACTIVITY ON A COMPUTER

RELATED APPLICATIONS

This Application is a Continuation of and claims benefit from U.S. patent application Ser. No. 12/336,868, that was filed Dec. 17, 2008, that was issued on Oct. 21, 2014 as U.S. Pat. No. 8,868,722, and that is incorporated herein by reference in its entirety.

BACKGROUND OF INVENTION

1. Field of Invention

The techniques described herein are directed generally to the field of computer applications, and more particularly to techniques for monitoring activity on a computer.

2. Description of the Related Art

Systems exist for collecting data from computers executing in the field, i.e., in environments where they are used by customers who purchased the computer systems or aspect thereof. For example, the developers of some software applications insert special probe or event functions into the software code, producing instrumented software code. The instrumented software code instructs the computer on which the code is running to store some limited information specified by the software developers, about the software and/or its operating environment, in a location in computer memory or in computer storage media. The information may be transmitted for a number of reasons by the computer system to the software developer who may analyze the data. For example, if a software application crashes, that information may be transmitted back to the software developer, who may then look for information useful in debugging errors in the software.

SUMMARY OF INVENTION

The inventors have recognized and appreciated the desirability of an improved mechanism of monitoring data on a computer, in particular, including an installed base of client machines, for any number of purposes, including to evaluate the performance of software components (e.g., application programs or other software components) in real world use environments.

For example, the inventors have recognized that it may be useful to provide a more flexible mechanism of tracking and evaluating data. One non-limiting use for the mechanism is to monitor performance data, such as how quickly a computer responds to a user input. An example of a scenario relating to user responsiveness discussed below is the rendering of a menu in a user interface, in which the rendering is in response to the user's clicking a control in the user interface. Gathering data relating to responsiveness of the computer in the field enables the developer of a software component to understand the reasons why its software may at times perform less responsively than desired and to modify the software component to address performance.

Applicants have appreciated that tracking all of the information that may be desired about a scenario all the time may be prohibitive in terms of resource consumption, and that it may be desirable to turn on extended tracing only when certain performance conditions are detected.

In accordance with one embodiment of the invention, a technique is provided which allows for an initial set of information to be tracked, and then, based on an evaluation of the initial set of information, the computer may be configured to track a different set of information. The second set of data may differ from the first in any respect desired, as the aspects of the present invention relating to configurability are not limited in this respect. In one embodiment, the first set of information may be a minimal set of information to track performance of an aspect of the system (e.g., how long to launch the start button). The first set of information can be tracked and if the system is performing within an acceptable performance range, the system can continue to monitor the minimal first set, thereby minimizing the resources expended to monitor performance. However, if it is determined from the minimal information in the first set that the performance is not within the acceptable range, the system can be configured dynamically to monitor the expanded second set of data that provides more information that may be useful in determining causes of the unacceptable performance. In this way, all desired information can be gathered but only when needed, so that resources are not expended in gathering extra data unnecessarily when the system is performing well.

The foregoing is a non-limiting summary of the invention, which is defined only by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
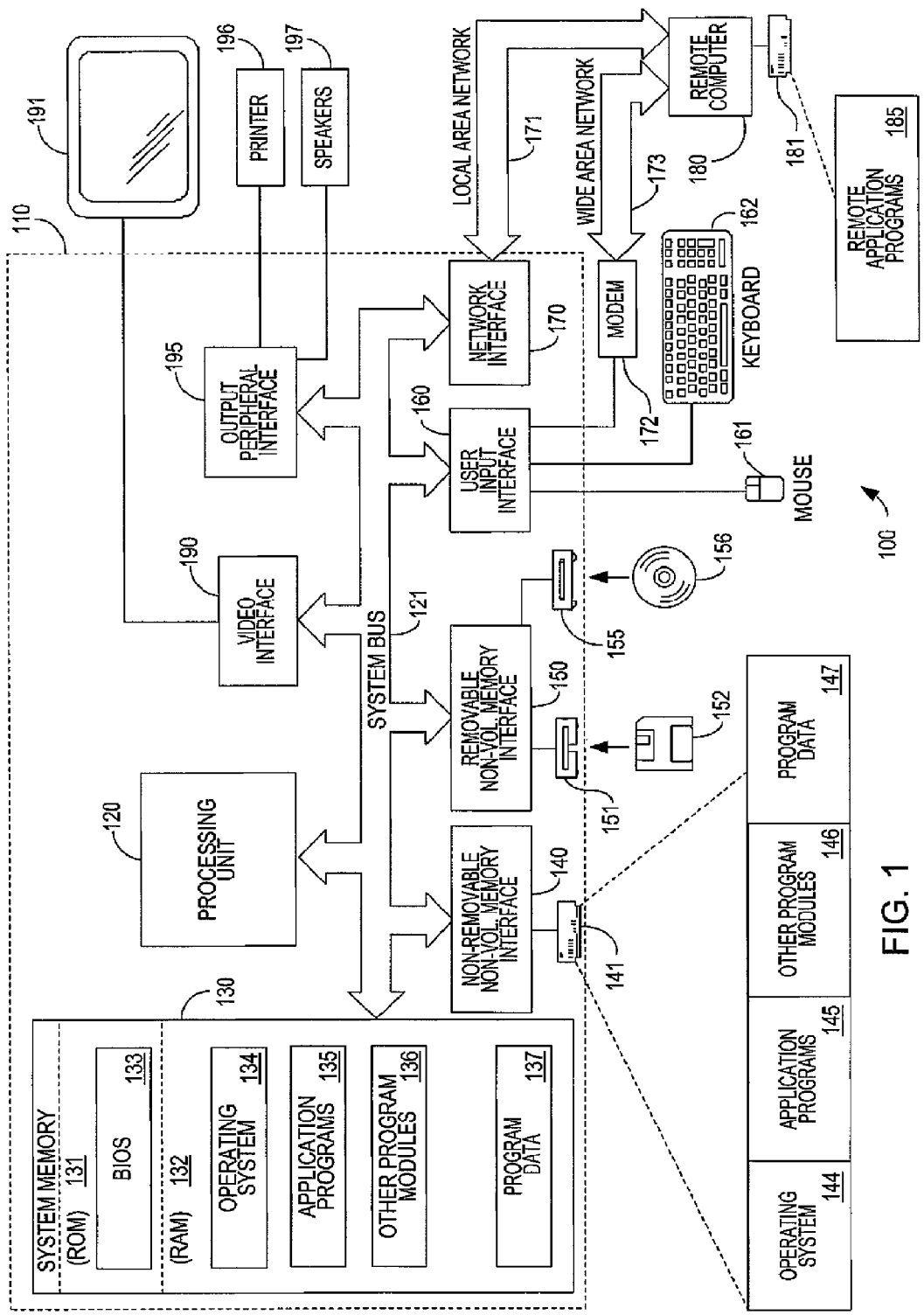
FIG. 1 is an illustration of a conventional computing device, illustrating an environment in which the activity of the computing device may be monitored in accordance with some embodiments of the invention.

Applicants have recognized that existing methods of collecting data from instrumented software have certain limitations that limit the types of information that can be collected and that limit flexibility in configuring the system to specify what information is to be collected.

In one embodiment, the capability is provided to collect performance information that can indicate how the computer system is responding to certain stimuli (e.g., user inputs). This can be useful, particularly when monitoring computers in the field, as applicants have appreciated that it is often difficult to simulate all use conditions and environments in a production or testing setting. Thus, the ability to collect performance information from the field can be advantageous in helping a developer understand how its software is functioning in the field, and this information can be used for any suitable purpose (e.g., to inform changes to the software to improve performance).

Applicants have also recognized that conventional techniques that gather information using instrumented software fix the nature of the information to be gathered at the time the instrumented software is developed and deployed. If it is desired at a later time to further additional and/or different information, the software developer would need to make changes in instrumentation to the software code and possibly release the modified code to customers. In addition, it should be appreciated that collecting information from the computer system consumes resources (e.g., processing power, memory, etc.) on the computer system. With instrumented software, whatever information is to be collected typically is collected every time the software executes. Thus, the provider of instrumented software must make tradeoffs between how much information it is desires to collect and the resources consumed on the computer system to collect large amounts of information.

Applicants have appreciated that a more flexible method for tracking data about software executing on a computer would be beneficial. For example, for some applications it may be useful for the computer to be dynamically configurable to track additional and/or different data related to a particular scenario on the computer without the need for re-instrumenting software code.

In accordance with one embodiment of the invention, a technique is provided which allows for an initial set of information to be tracked, and then, based on an evaluation of the initial set of information, the computer is configured to track a different set of information. The second set of data may differ from the first in any respect desired, as the aspects of the present invention relating to configurability are not limited in this respect. In one embodiment, the first set of information may be a minimal set of information to track performance of an aspect of the system (e.g., the responsiveness of the system in displaying a menu after a user selects an input that leads to display of the menu). The first set of information can be tracked and if the system is performing within an acceptable performance range, the system can continue to monitor the minimal first set, thereby minimizing the resources expended to monitor performance. However, if it is determined from the minimal information in the first set that the performance is not within the acceptable range, the system can be configured dynamically to monitor the expanded second set of data that provides more information that may be useful in determining causes of the unacceptable performance. In this way, all desired information can be gathered but only when needed, so that resources are not expended in gathering extra data unnecessarily when the system is performing well.

Applicants further appreciated that the nature of the infrastructure used in tracking and reporting information is limited because it conventionally depends upon the resource (e.g., software code being monitored to also capture the information to be reported). Applicants have appreciated that benefits can be achieved by instead employing an event based infrastructure wherein a separate and persistent agent receives events from the resource being monitored (e.g., an instrumented software application which generates events). The persistent agent may process the events according to instructions that are provided by the developers of the resource that generated the events and instruct the agent in how to interpret the events. For example, the developers of the resource may instruct the persistent agent to associate certain events with a particular scenario, such as the display of a menu on a user interface. The agent may then process the events in a way instructed and report them to another entity for analysis. For example, in some embodiments of the invention, the persistent agent may report the events to a third party off the computer. In one example, the agent may be used to track performance information and may report it to the developer of the software whose performance is being tracked.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of the aspects of the invention, as the aspects of the invention described herein can be used with any computing system. Neither should the computing environment 100 be interpreted as having any dependency or requirement relating to any one or combination of components illustrated in the exemplary operating environment 100.

FIG. 1 illustrates a general purpose computing device in the form of a computer 110. Components of computer 110 may include, but are not limited to, a processing unit 120, a system memory 130, and a system bus 121 that couples various system components including the system memory to the processing unit 120. The system bus 121 may be any suitable bus structure, such as a memory bus or memory controller, a peripheral bus, and/or local bus using any suitable bus architectures. By way of example, and not limitation, such architectures may include Micro Channel Architecture (MCA) bus, Video Electronics Standards Association (VESA) local bus, and Peripheral Component Interconnect (PCI) bus also known as Mezzanine bus.

Computer 110 may include any one or more of a variety of computer readable storage media. Computer readable storage media can be any suitable media that can be accessed by computer 110 and includes volatile and nonvolatile storage media, and removable and non-removable storage media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic storage media, a magnetic disk drive 151 that reads from or writes to a removable, nonvolatile magnetic disk 152, and an optical disk drive 155 that reads from or writes to a removable, nonvolatile optical disk 156 such as a CD ROM or other optical storage media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1, may provide storage of computer readable instructions, data structures, program modules and/or other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices may be connected to the processing unit 120 through a user input interface 160 that is coupled to the system bus, but may be connected by other interface and bus structures, such as a parallel port, game port or a universal serial bus (USB). A monitor 91 or other type of display device may also be connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other type of network node, and may include many or all of the elements described above relative to the computer 110, although only a memory storage device 181 has been illustrated in FIG. 1. The connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other component for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other ways of establishing a communications link between the computers may be used.

Figure 2:
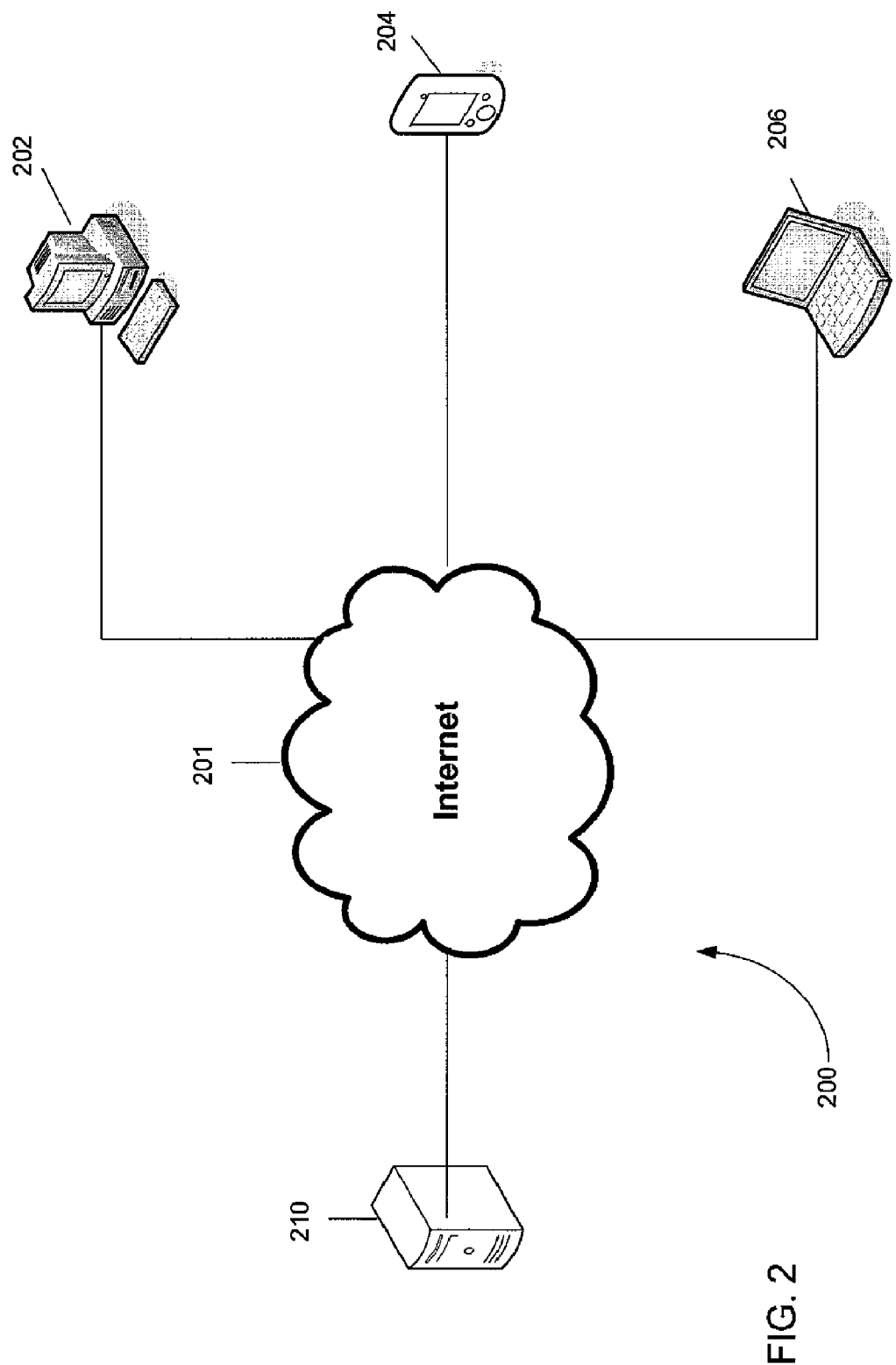
FIG. 2 is an illustration of a computer environment in which embodiments of the invention may be employed.

FIG. 2 illustrates a higher-level system configuration 200 in which the embodiments of the invention described herein may be implemented. The system 200 includes a number of computing devices (each of which may be configured as discussed above in connection with computer 110 or otherwise) and may be connected to one or more servers 210 via one or more communications media. In the example illustrated, the communications medium is the Internet 201, but any suitable communications medium may be used. The computing devices each may be any suitable computing device capable of executing computer instructions, such as a desktop computer 202, PDA 204, a laptop computer 206, etc. In the example illustrated, the system 200 includes a single instance of a number of different types of computing devices 202, 204 and 206, but the aspects of the invention described herein are not limited, in this respect, and can be used to collect information from single computer, a set of multiple homogeneous types of computers, and/or with any number of instances of any number of different types of computers. In one embodiment, the computers coupled to the server 210 comprise all or a subset of the installed base for a software component loaded onto a plurality of computing devices. In this embodiment, each computing device having the software component loaded therein may track data associated with the software component. As discussed above, in one embodiment of the invention, each computing device may track user responsiveness data, or data indicating how quickly a software component (e.g., a software application) responds to user input, but the invention is not limited to tracking this type of data.

A computing device that tracks data may report results to another entity for analysis. The other entity performing the analysis may be a separate software component executing on the same computing device that tracked the data, or it may be on a separate computing device. In the embodiment illustrated in FIG. 2, the computing devices report their data to a server 210, which may be owned or controlled by the provider of the software component for which data is being tracked. For example, when the computers 202, 204, 206 include the installed base (or subset thereof) for a software component provided by a software vendor, the server 210 may be owned and/or controlled by the software vendor, who may collect data from the installed base for any reason (e.g., to collect performance information or for some other purpose).

The server 210 may be implemented as a single computer server, or as multiple computer servers configured in any manner (e.g., configured to act as a cohesive system). If server 210 is implemented as multiple computer servers, the multiple servers may be configured in any suitable way. For example, each server in the system may perform a different type of processing, or all the servers may perform the same type(s) of processing but be distributed in such a way as to balance the processing load on any one server, or a combination of either approach. Additionally, other embodiments of the invention may include multiple servers operating independently, such as mirror sites for a single software provider, or multiple servers from a number of different software or hardware providers. As should be appreciated from the foregoing, the analysis of the data may be performed by any suitable computing device(s) in any suitable way, including using any one or combination of the approaches discussed above.

Regardless of the implementation of server(s) 210, in some embodiments of the invention, upon analyzing some or all of the tracked data provided by one or more computing devices, such as computing devices 202, 204, and 206, server 210 may communicate back to the computing device(s) instructions to reconfigure the computing device(s) to track different data for analysis. The different data can include some or all of information previously tracked as well as some new data or may be entirely new data. It is to be appreciated that the instructions to reconfigure the computing device may come from a computing device besides server 210, for example, in a peer-to-peer computing environment. The instructions may also be generated locally from one of computing devices 202, 206, or 206.

As discussed above, in one embodiment of the invention, the data tracked may be responsiveness data (e.g., indicating how quickly a software component reacts to user input). In one embodiment, this embodiment may be combined with the embodiment wherein the server(s) that collect data may communicate back to the computers monitoring the data to reconfigure them with regard to which information is tracked, although these embodiments are not limited to being used together. When these two aspects of the invention are used together, they may be combined in any suitable manner, one example of which will now be described that seeks to minimize the import of the data collection on the computer system.

In this respect, in one embodiment, the computer system(s) may be configured to collect a relatively small set of data that is suitable to enable a determination to be made (e.g., by the server(s) 210) of whether the performance of the system is acceptable. As one example, a scenario that may be monitored is the responsiveness of the system in displaying a menu after a user selects an input that leads to display of the menu. Initially, the system may be configured to receive data about events indicating when the input has been selected and when it is displayed. The computer and/or the server may then process these events appreciate that they belong to the scenario of displaying a menu and may calculate how long it takes during execution. In some embodiments of the invention, the processing of these events may occur in real time; however, the invention is not limited in this respect. In other embodiments, the processing may occur offline at a later time or on another computing device. Regardless of the time or manner of processing the events, if the time is within an acceptable range, the server 210 may maintain the same configuration and continue to monitor a relatively small set of data to minimize the impact on the computer system of the data collection. However, if it is determined (by the computer and/or the server) that the performance is undesirably slow, the server may cause the computer to become reconfigured to collect additional data that may comprise any other information about the computer system that may be desired to evaluate the reasons why performance is undesirably slow.

It should be appreciated that the above example of performance measurement for a menu display is merely one example as the aspects of the invention described herein are not limited to measuring performance of any particular scenario. The aspects of the invention described herein can be implemented in any suitable manner, and are not limited to any particular implementation. An illustrative implementation will now be described merely for purposes of illustration.

Figure 3:
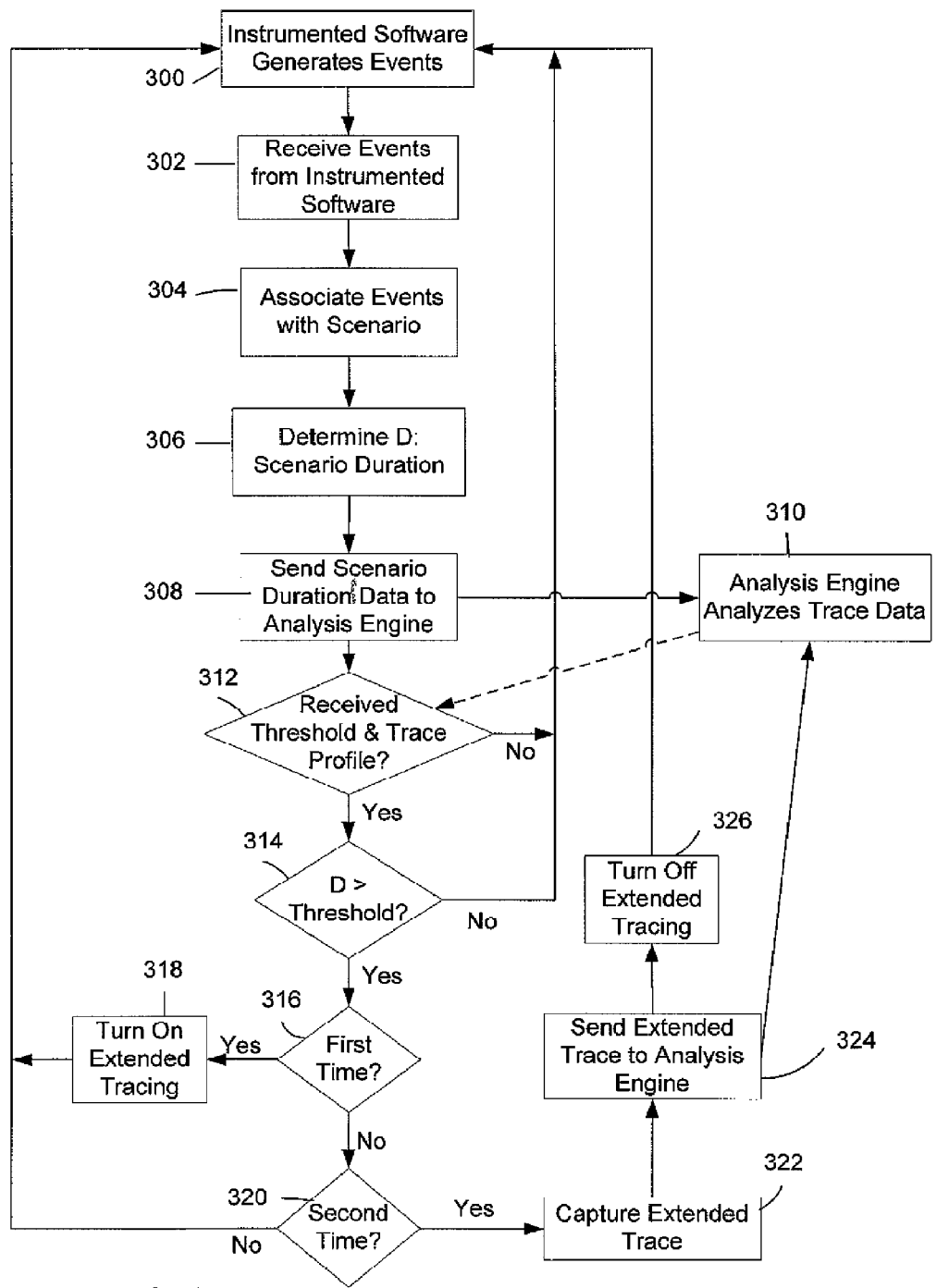
FIG. 3 is a flowchart illustrating a method of tracking user responsiveness data in accordance with one embodiment of the invention.

FIG. 3 illustrates a flowchart of an illustrative method of implementing one embodiment of the invention. The embodiment illustrated in FIG. 3 is described as tracking user responsiveness data, but this is described merely for purposes of illustration, as the invention may be used to track other types of data. For example, the invention could be used to track other types of performance data, such as the length of time to perform matrix calculations in a scientific application, throughput of a network interface, and other types of data, including data unrelated to performance.

In the illustrative embodiment of FIG. 3, the user responsiveness (or other type of) data is tracked by instrumented software generating events. However, any suitable way of tracking user responsiveness data may be used. In one embodiment of the invention, the generation of the events is implemented by a software developer inserting event generating functions in areas of the software code which relate to the scenarios to be monitored (e.g., user responsiveness scenarios). However, in an alternate embodiment of the invention, rather than requiring a software developer to add event functions to the software code himself, the software code may be processed by a tool which automatically inserts even generating code in locations in the software code or in the binary machine instructions. Any suitable technique may be used for generating or inserting events. Additionally, some embodiments of the invention may not require the insertion of events. For example, debugging technology may be used to trigger particular software instructions to execute if the CPU Execution Unit encounters certain addresses.

In the embodiment illustrated in FIG. 3, the computer system to be monitored is executing and at block 300, the instrumented software generates events on the computing device (e.g., one of computing devices 202, 204, or 206). In the case of user responsiveness data, a user of the computing device interacting with the instrumented software may take actions that cause the instrumented software to generate the events. In the example discussed above, such interaction may be clicking the mouse in a user interface to request the display of a menu of available commands. At block 302, a persistent agent may receive the events. The persistent agent may be implemented in any suitable way, (e.g., in hardware and/or software), and may be on the same computing device as the one which generated the events or on a different computing device.

In block 304, the persistent agent associates the received events with scenarios to which they belong. In some embodiments of the invention the processing of the events by the persistent agent is done in real time, although the invention is not limited in this respect. In this respect, in accordance with one embodiment, the persistent agent executes instructions provided (e.g., is programmed) by the software component (e.g., the instrumented software) that generates the events or the provider thereof so that the agent can understand the significance of the events and associate them with higher level scenarios. The agent can be programmed to process the events in any suitable manner, as the aspects of the invention described herein are not limited in this respect.

For example, with the illustrative example where the events track the length of time for a menu in a user interface to display after a user has requested the display of the menu via a mouse click, separate events may relate to the user issuing the request and the display being rendered with the menu. In the embodiment illustrated by FIG. 3, the persistent agent may perform a calculation in block 306 to determine the scenario duration for each scenario for which it has received events. For the example of the scenario being the display of a menu, the agent may do so by calculating a difference in time between the two events it is programmed to recognize as a scenario. However, it should be appreciated that any suitable way of processing the events of a scenario may be used. In addition, although the agent processes events for a scenario in one embodiment, the aspects of the invention described herein are not limited in this respect, as the raw event information can be provided (e.g., to the analysis engine discussed below) by the agent rather than information resulting from a processing of the raw event information, as the processing can alternatively be done by another component in the system (e.g., the analysis engine).

In block 308, the persistent agent provides the scenario duration data (and/or the raw event data) to an analysis engine. In some embodiments, additional or alternative information may be transmitted to the analysis engine, such as information regarding other applications currently running on the computing device, the time since the last boot, the amount of free memory available on the computing device, etc. As discussed in conjunction with FIG. 2, the entity performing the analysis may be implemented in any suitable way, including on the same computing device which generates the events, or on any number of other computing devices configured in any suitable way. As discussed above, in one embodiment, the analysis engine may be on one or more computers of the provider of the software being monitored, and may receive scenario duration data from a plurality of computers (e.g., all or a subset of an installed customer base). The analysis engine performs an analysis of the provided data at block 310. Any type of analysis may be performed, as aspects of the invention are not limited in this respect. In one embodiment, the analysis may include determining whether one or more scenarios warrant further investigation. For example, if the duration of a scenario monitored for performance is longer than expected or desired, the analysis engine may desire to track additional information help diagnose reasons why the duration might have been so long.

The determination by the analysis engine to gather additional information may be based on any suitable considerations, as the aspects of the invention are not limited in this respect. For example, if the analysis engine receives data from multiple computing devices relating to the same scenario, and several show undesirably long scenario durations, it may choose to not collect additional information from all computing devices exhibiting this behavior. Rather, the analysis engine may limit the collection of additional information from a certain number of computing devices, e.g., to limit the amount of additional data the analysis engine will have to analyze within a given period of time, to not unnecessarily burden a large number of computing devices, etc. Similarly, in some embodiments, the analysis engine may determine that it would be appropriate to modify the frequency with which information on the computing device is gathered and/or transmitted to the analysis engine, and may request of the computing device a corresponding change in frequency.

When the analysis engine chooses to request that the computing device track additional information, it may communicate this request back to the computing device. In the embodiment illustrated in FIG. 3, it is determined at block 312 whether the persistent agent has received the analysis engine instructions to change the information being monitored. In one embodiment, the instructions are provided in the form of a threshold value and a trace profile along with information indicating the scenario to which the request relates, although the invention is not limited in this respect and reconfiguration instructions can take other forms. In some embodiments, the trace profile and other instructions, such as the threshold value, may be transferred from server 210 at different times and/or through different communication mechanisms, as the invention is not limited in this respect. The threshold value may represent any desired calculation. For the example scenario of displaying a menu, the threshold value may correspond to a length of a duration of a further occurrence of the scenario at which the persistent agent should track additional data. The trace profile in this embodiment may include a list of specific types of additional information which the analysis engine desires to be tracked. The arrow from block 310 to block 312 is represented with dashed lines to indicate that the analysis engine may not communicate back a request for additional information, including for the exemplary reasons discussed above.

In the embodiment shown, the threshold is provided because the analysis engine may determine that it is not desirable to implement an expanded trace profile (which may add a burden to the computer) unless the undesirable performance of the scenario is again observed, with the threshold being either the same, shorter than or longer than the duration the analysis engine may use to determine whether to contact the agent regarding potentially expanding the tracing. However, not all embodiments are limited in this respect, as the analysis engine could alternatively instruct the agent to implement expanded tracing immediately. In addition, for embodiments wherein reconfiguration of the tracing information is not performance based, there may be no duration being monitored to compare against a threshold, so reconfiguration or changing of the information being monitored can be changed immediately. In other embodiments of the invention, the analysis engine provide additional or alternative conditions besides the threshold value which must be satisfied before enabling expanded tracing on the computing device. This may allow the analysis engine to further specify criteria under which a particular problem may manifest itself, in order to further avoid unnecessarily turning on expanded tracing. For example, expanded tracing may only be enabled based on the presence of or values contained within a particular registry key or file, or it may only be enabled if a particular service is currently running on the computing device, although other embodiments may take into account additional or alternative considerations.

When it is determined at block 312 that the agent did not receive a request for expanded tracing, the process returns to block 300 to continue with the original tracing configuration. When it is determined that the persistent agent received a request from the analysis agent to track additional information dependent upon exceeding a specified threshold, the agent continues receiving events from the instrumented software and calculating the scenario durations as before. At block 314, the persistent agent checks the duration of the scenario being monitored, and determines if it exceeds the threshold received from the analysis engine. If not, the process again returns to block 300 to continue with the originally configured tracing. When it is determined that the threshold is exceeded, the process proceeds to block 316, where it determines if this is the first time the threshold has been exceeded. If so, the process proceeds to block 318 wherein the persistent agent may adopt the new tracing configuration (e.g., turn on extended tracing in the example), and may return to block 300. In one embodiment of the invention, the new tracing tracks the types of information which were specified by the analysis engine to the persistent agent in the trace profile. As mentioned above, the new tracing can take any desired form, as the invention is not limited in this respect. In one embodiment, the new tracing may track information temporally related to the scenario, including any general or specific information about the computing device. As mentioned above, it may be more computationally intensive to track the new set of information, but it may be tracked only in response to a particular scenario of interest to the analysis engine, and may aid in the analysis of a cause of a particular performance problem on the computer.

When it is determined at block 316 that the threshold has not been exceeded for the first time, the process proceeds to block 320 where the persistent agent determines whether the scenario duration exceeded the threshold for a second time. If so, the persistent agent may capture the extended trace associated with the scenario in block 322, and then provide the extended trace data to the analysis engine for further analysis in block 324. In one embodiment the process proceeds to block 326 to turn off the additional tracing and then proceeds back to block 300.

In the embodiment shown in FIG. 3, the persistent agent may only perform additional tracing once for each request from the analysis server for additional information relating to a particular scenario, so that additional tracing is turned off in block 326 and extended traces are not captured (and should not be generated) if determined in block 320 that the exceeding of the threshold did not occur for the second time (meaning it was the third or higher). However, in other embodiments, the persistent agent may continue to track the additional information for as many times as the duration of the scenario exceeds the threshold until it receives further communication from the analysis server to stop gathering additional information relating to that scenario. In addition, in some embodiments, based on performing further analysis of the additional data provided in the extended trace, the analysis engine may send a follow up request relating to the same scenario, with a different duration and/or a different trace profile requesting the monitoring of a different set of information (which may share some traces with the prior set). Thus, the method has the flexibility to adapt to tracking different types of data if it may be helpful in diagnosing a particular problem on the computer.

Figure 4:
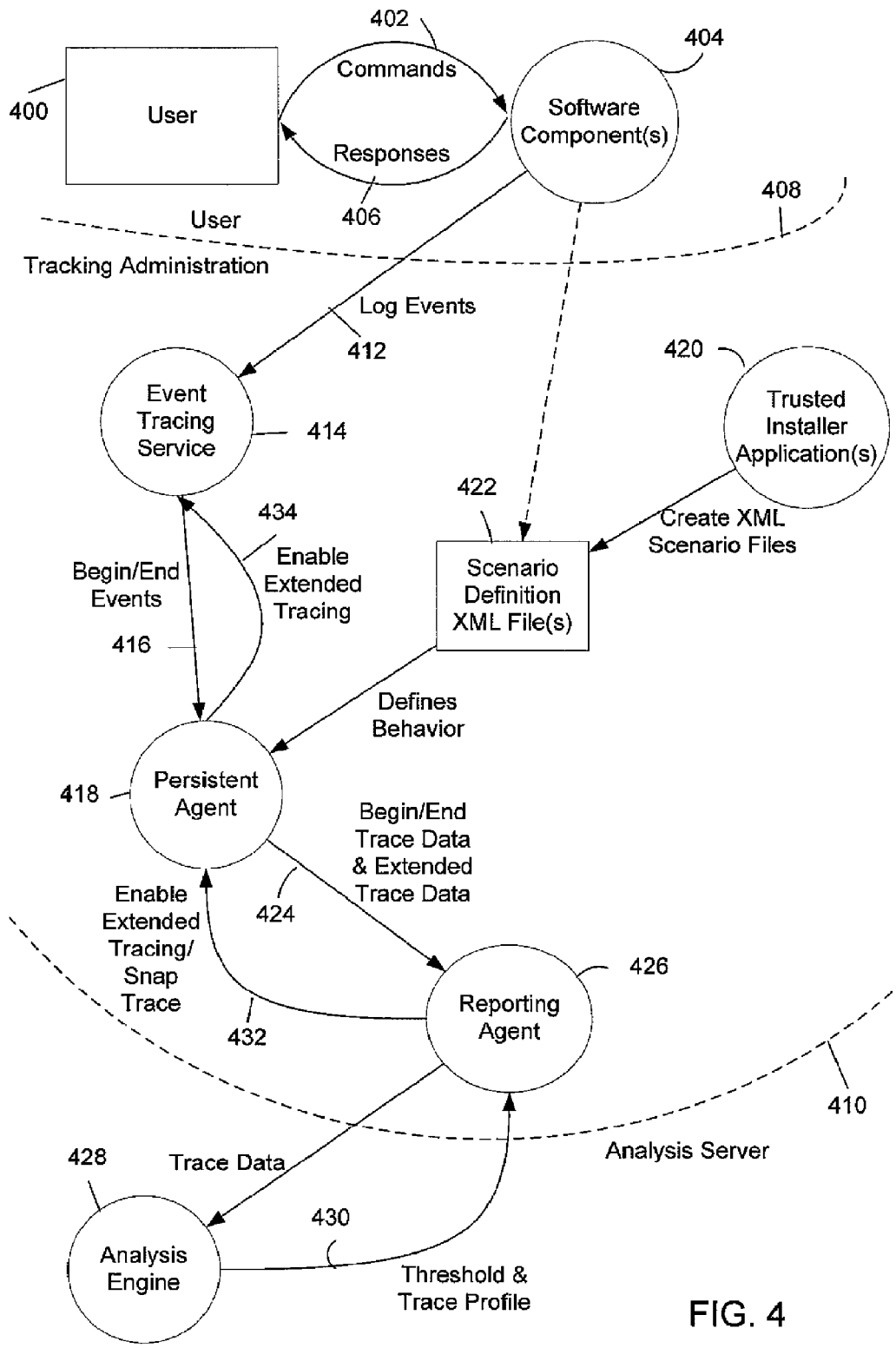
FIG. 4 is a diagram illustrating an architecture for tracking user responsiveness data in accordance with one embodiment of the invention.

As mentioned above, the aspects of the present invention described herein can be implemented in any of numerous ways. FIG. 4 illustrates one illustrative architecture but other architectures are possible to implement the method of FIG. 3 and other methods in accordance with the techniques described herein.

A user 400 may send commands 402 to one or more software components 404 running on a computing device, such as any of the computers discussed above (e.g., desktop computer 202, PDA 204, laptop computer 206 of FIG. 2). The reference to software components should be understood to refer to any type of executable code on the computer, including all or portions of application programs, operating system components or other types of code. The commands 402 from the user (who may be a system administrator or any other user) may be received on one or more computers via a user interface, such as by the user's clicking a button on his mouse to activate a control in the user interface, via a command line interface, or any other suitable user interface. In response to the commands 402, the software components 404 may send responses 406 back to the user 400. The responses 406 may be delivered in any suitable way, including creating and populating a file, displaying text on a display device, sending data over a network, etc. The types of responses 406 may vary based on the nature of the commands 402.

In one embodiment of the invention, software components 404 may generate events to track user responsiveness data. The events may be generated using any suitable technique, including any of those discussed in conjunction with FIG. 3. In some embodiments, the events may include an indication of a user responsiveness scenario with which they are associated, but not all aspects of the invention are limited in this respect, as the events can relate to other types of scenarios. In other embodiments, however, the events themselves do not contain any indication of a particular scenario with which they are associated, as the scenario information may be provided in any suitable way, including via scenario definition file(s) 422, discussed in more detail below. In embodiments in which events contain an indication of a scenario, the indication may be provided any number of ways. In one embodiment of the invention, the events are generated via one or more special event function calls inserted in the software component(s). The special event function call(s) may be passed one or more arguments. In one embodiment of the invention, one argument to the function call(s) may be a scenario identifier (ID), identifying the scenario with which the event(s) are associated. The scenario ID may be obtained in any suitable way. In one embodiment, an ID manager manages scenario IDs to ensure uniqueness. A developer of a software component wishing to enable the component to track user responsiveness data or data for other types of scenarios may obtain unique scenario IDs from the ID manager for each scenario it would like to track. The ID manager can take any desired form. For example, in one implementation, the monitoring techniques described herein can be implemented by a developer of software for its exclusive use in monitoring its own software components (e.g., application programs, operating systems, etc.), so the software developer may include an ID manager to assign scenario IDs. In an alternate embodiment, the techniques described herein can be offered by an entity that implements the system as a service to others (e.g., software developers) to enable the others to monitor their own software components, so that the provider of the service may have one or more ID managers that provide scenario ID's to users of the service.

In some embodiments, an event function may also be passed other arguments. These arguments can take any form, as the invention is not limited in this respect. For example, the event functions may be passed a descriptive name of the scenario, and/or a uniqueness identifier, such as a thread ID of the thread of execution generating the event, a process ID for the process generating the event, a GUID to uniquely identify the events comprising the occurrence of a scenario, etc. For example, if the scenario is one measuring responsiveness to a user action (e.g., the display of a menu in a user interface) that may occur multiple times, each occurrence of the scenario may be uniquely identified. In embodiments in which the indication of a scenario is not included in an event, the uniqueness identifier of an event may be used to associate an event with a scenario at a later time, although an event may be associated with a scenario in any suitable way. A data payload may also be passed as an argument, specifying data to be tracked in the tracing and in some embodiments information provided by the software developer to inform the agent how to interpret and/or process the events relating to the scenario. In some embodiments, a current timestamp may also be provided as an argument, or it may be included automatically by the event function.

In the embodiment illustrated by FIG. 4, the administrator desires to track a duration of the scenario. In some embodiments, to facilitate duration tracking, event functions may also be passed an argument whose values may comprise "begin" or "end," corresponding to the beginning or the end of the scenario, respectively. Thus, while any number of events (including no additional events) may be associated with the scenario, in this embodiment, the events for the scenario comprise at least a "begin" and an "end" event.

Other techniques could also be used for tracking the duration of a scenario that do not require a "begin" or "end" event. In general, the start and end of a scenario may be defined in any suitable way. For example, the end of a scenario may be defined with an "end" event, yet the beginning may be defined by an action such as the "boot" of the system. In this example, while an action, such as the "boot" of a system, was not indicated by an actual event, the existence of that action was made known in some way to the entity tracking the duration of a scenario.

In FIG. 4, the boundary line 408 illustrates a conceptual boundary between the functionality exposed to a user to configure the system and the functionality performed by the system to administer the tracking of scenario data configured by the user. Similarly, boundary line 410 illustrates a conceptual boundary between the functionality of the system that performs the tracking of scenario data and the analysis of that data.

It is to be appreciated that functionality attributed to any of the components illustrated between boundary lines 408 and 410 or below boundary line 410 may be distributed in any suitable way as the aspects of the invention described herein are not limited in this respect. For example, functionality illustrated as being implemented by separate components may in alternative embodiments be implemented all by the same component. Conversely, multiple components may be used to implement in some embodiments the functionality ascribed to a single component in FIG. 4. The components may be implemented in any combination of hardware and software, and when implemented in software, may be implemented in any suitable way, e.g., in a user address space, a kernel address space, etc.

As discussed above in conjunction with FIGS. 2 and 3, any of the functionality performed by the components in FIG. 4 may be performed on the same computing device as the computing device executing the software components(s) which generate the events, may be implemented on one or more other computing devices, or any combination thereof. If implemented on multiple computing devices, the multiple computing devices may be configured to act as a cohesive system, or to act independently from one another. For the purposes of the following discussion, the components appearing between boundary lines 408 and 410 are considered to be implemented on the same computing device which generates the events, and that the components below boundary line 410 are implemented on a different, single, computing device (e.g., a server owned by the developer of the software component(s) that generate the events). However, embodiments of the invention described herein are not limited in this respect.

In the embodiment of FIG. 4, the events 412 generated by software components 404 are received by an event tracing service 414. The event tracing service 414 may receive events relating to user responsiveness data or any other scenario as discussed above. In one embodiment of the invention, the event tracing server 414 may also receive a number of other types of events generated on the computing device. As shown by action 416, the event tracing service 414 may send the events, which may include begin events and end events for a scenario, to a persistent agent 418. The agent 418 is described as persistent because its execution is independent of that of the software component(s) being tracked, and may in some embodiments always be executing when the computer on which the software component(s) execute is turned on.

The persistent agent 418 may have knowledge of one or more scenarios to which the events generated on the computing device may relate. In an embodiment of the invention, the knowledge of scenarios is provided to the persistent agent 418 by installer programs for each software component on the system that generates events. Thus, the developer of a software component may have the ability to program the persistent agent 418 to recognize and/or process the events generated by their component in any desired way. In one embodiment of the invention, only trusted installer applications 420 may provide scenario knowledge to the persistent agent 418. An installer application may prove itself to be trustworthy in any suitable way, including by having been assigned administrator privileges, by possessing a security certificate verifying the identity of its creators, or in other ways. The trusted installer application(s) 420 may provide scenario knowledge to the persistent agent 418 in any suitable way, including by writing values to a software registry on the computing device or using other techniques. In the embodiment of the invention illustrated by FIG. 4, the trusted installer application(s) 420 create one or more scenario definition files 422, which may be provided by software component 404, and which may define the scenarios for one or more of the software components which generate events. In one embodiment, the file(s) may be created at a specific location in a computer storage media known to the persistent agent 418 to contain such files, but other techniques are possible. The files may be in any suitable format, including text, binary, XML, or any other format.

The persistent agent 418 may read and parse the scenario definition file(s). While one agent 418 is shown in FIG. 4, it should be appreciated that multiple agents can be employed. When multiple agents are employed, they can share the functions described herein in any way (e.g., by having different agents process different scenario definition files for different scenarios).

In some embodiments of the invention, the persistent agent 418 may periodically poll the known location for new or updated files or receive new files in any other suitable way. For example, in other embodiments, the persistent agent 418 may receive a notification from trusted installer applications 420 that the installer has just updated or created a new scenario definition file. Regardless of the specific method of obtaining knowledge of new or updated scenarios, the persistent agent(s) 418 may use the scenario knowledge provided by the software developer to associate events with a scenario. In one embodiment of the invention, the persistent agent(s) 418 may also determine which occurrence of a scenario an event corresponds to using any of the techniques discussed above.

In embodiments of the invention in which an event does not contain an indication of a scenario with which it is associated, the scenario definition files 422 may contain scenario definitions as well as scenario identifiers. Each scenario definition may also reference a uniqueness identifier, discussed above, associated with an event. In some embodiments, the persistent agent 418 may then draw upon both the uniqueness identifiers associated with events and the scenario identifiers to build a two-way mapping and determine which identifiable events are referenced by which identifiable scenarios.

In the embodiment illustrated in FIG. 4, the persistent agent(s) 418 may also calculate the duration of time of each occurrence of a scenario that relates to responsiveness. This may be done, for example, by comparing a timestamp associated with the "begin" event in a scenario occurrence with the timestamp associated with the "end" event in the scenario occurrence, although other techniques can be employed. By having the agent(s) 418 process the events for a scenario (e.g., by calculating responsiveness for a responsiveness scenario), the agent can provide the analysis portion of the system (e.g., analysis engine 428) with higher level information about the meaning of the events, as opposed to the raw event information. However, the aspects of the invention described herein are not limited in this respect, as alternatively the agent(s) can pass along raw event data and the analysis portion of the system may interpret it.

The persistent agent(s) 418 may also pass trace data 424 to a reporting agent 426. In some embodiments, the trace data 424 passed to the reporting agent 426 may include calculated durations of scenario occurrences or other data captured for the scenario event, and a scenario ID. The reporting agent 426 is responsible for reporting the trace data to the analysis portion of the system (e.g., an analysis engine 428). When the analysis engine 428 is on a separate machine, the communication between the analysis engine 428 and the reporting agent 426 may be over any suitable communications medium, such as the Internet 201 (FIG. 2).

As described in conjunction with FIG. 3, the analysis engine 428 may analyze the provided trace data and make a determination (in any manner) to modify the data being traced in any way. In the embodiment of the invention illustrated in FIG. 4, the analysis engine 428 may determine that a duration of a particular scenario occurrence is longer than a particular threshold. If this is the case, the analysis engine may choose to request additional trace data relating to a particular scenario to aid in diagnosing a possible cause for the long scenario duration. As discussed above in conjunction with FIG. 3, in some embodiments, even if the analysis engine 428 determines a scenario duration is of a length such that it may warrant further investigation, the analysis engine 428 may also consider other factors before requesting that the computing device gather additional data related to the scenario.

If the analysis engine determines that it would like to request additional trace data relating to a particular scenario, it may communicate back to the reporting agent 426 servicing the computing device on which the scenario occurred, or to some other component on that computing device, requesting modified tracing. In one embodiment, request 430 from the analysis engine to the reporting agent 426 for modified (e.g., additional) tracing data may include a scenario ID for the scenario of interest, a threshold value and a trace profile as discussed in conjunction with FIG. 3, but the aspects of the invention described herein are not limited in this respect, as the request can take any suitable form. Upon receiving the request 130 from the analysis engine 428, the reporting agent 426 may monitor events which continue to be generated by the software component(s) 404 and provided by the persistent agent 418, matching the scenarios of incoming events with the scenario ID of interest to the analysis engine in any desired way. For example, if the duration of any incoming scenario exceeds the threshold value, reporting agent 426 may communicate back to the persistent agent 418, placing a request 432 for the persistent agent 418 to enable modified (e.g., extended) tracing relating to the scenario of interest. While modified (e.g., extended) tracing is not requested unless the threshold is exceeded. In accordance with one embodiment, it should be appreciated that the aspects of the invention described herein are not limited in this respect, as any other technique for applying the modified tracing can be employed, including applying it immediately. Any suitable way of communication back to the persistent agent may be used. In one embodiment of the invention, the communication of request 432 is via a callback mechanism, but other techniques can be used. The request 432 may include the trace profile provided by the analysis engine 428 in request 430.

After receiving request 432 to enable modified (e.g., extended) tracing, persistent agent 418 may examine the trace profile provided by analysis engine 428. As discussed in conjunction with FIG. 3 above, the trace profile may comprise types of additional and/or different information which the analysis engine 428 is interested in tracking. If the trace profile includes tracking one or more other events than those already being tracked, the persistent agent may communicate back to the event tracing service 414 with a request 434 to enable tracing of the other types of events. As with request 432, any suitable communication back to the event tracing service 414 may be used, including communication of request 434 via a callback mechanism or other technique. As discussed in conjunction with FIG. 3 above, the type of information requested by the analysis engine may include any desired type of information that can be tracked (e.g., time since last boot, number of processes or threads running on the computing device, the amount of free memory on the computing device, etc.) as the techniques described herein are not limited to tracking any specific types of information. In addition, some embodiments may gather additional or alternative tracing information from one or more entities other than the event tracing service 414. For example, some embodiments may gather performance counters which may be managed by a different entity than event tracing service 414.

While the computing device is running with extended tracing enabled, reporting agent 426 may continue to monitor incoming scenarios, matching them to the scenario IDs of interest to the analysis engine 428. If it finds a second match for the scenario ID for which extended tracing has been requested (and optionally in which the duration exceeds the threshold), reporting agent 426 may communicate back a second time to persistent agent 418, requesting the persistent agent 418 to capture the extended trace data and optionally to turn off extended tracing for that scenario. As discussed above, while in one embodiment the modified (e.g., extended) tracing is captured only when a threshold is exceeded, all embodiments are not limited in this respect, as the capturing of the modified tracing can be performed in response to any condition or no condition at all. Similarly, while the modified (e.g., extended) tracing is turned off after being captured in one embodiment, all embodiments are not limited in this respect, as the modified tracing can continue to be captured.

When the persistent agent 418 receives a second callback request from the reporting agent 426 to turn off the modified tracing, the persistent agent 418 may similarly perform a second callback to the event tracing service 114 to disable the modified (e.g., extended) tracing. Persistent agent 418 may then capture the extended trace data using any suitable method and send it to the reporting agent 426. Reporting agent 426 may forward the modified (e.g., extended) trace data to the analysis engine 428, which may analyze the modified (e.g., extended) trace data in any suitable manner. Based on its analysis of the extended trace data, the analysis engine 428 may take any desired action impacting tracing for the scenario being analyzed or any other scenario, as the aspects of the invention described herein are not limited in this respect. For example, the analysis engine may choose to request additional information regarding a different scenario, to modify the type of information it requested regarding the scenario of interest discussed above, and/or take any other action.

Figure 5:
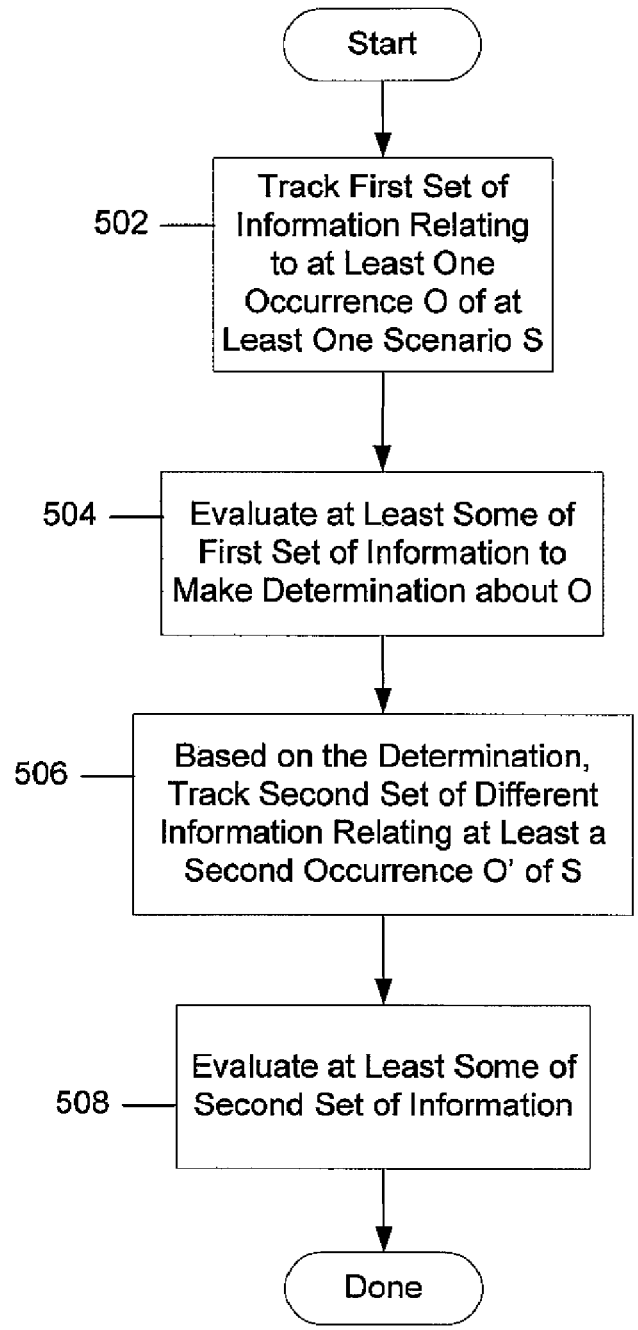
FIG. 5 is a flowchart illustrating a method of monitoring activity on a computer in accordance with one embodiment of the invention.

FIG. 5 illustrates a high-level flowchart for a method of monitoring activity on a computer according to one embodiment of the invention. As in the discussion above, the method could be implemented in either hardware or software, or any combination thereof, on any suitable computing device. At block 502, the method may track a first set of information relating to at least one first occurrence O of at least one scenario on the computer. At block 504, the method then may evaluate at least some of the first set of information to make a determination about the first occurrence O. Based on the determination made in block 504, the method may (in block 506) track a second set of information relating to at least a second occurrence (O') of the scenario. The second set of information may include at least some information not tracked in the first set of information. In block 508, the process may evaluate at least some of the second set of information about the second occurrence of the scenario.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable storage medium (e.g., a computer memory, a floppy disk, a hard disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

The phraseology and terminology used herein is for the purpose of description and should not be regarded as limiting. The use of "including," "comprising," "having." "containing," "involving," and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method performed on at least one computing device, the method comprising:

first receiving, by the at least one computing device, first events related to a first occurrence of a scenario performed by one or more computing devices and that are further related to performance of the one or more computing devices in performing the first occurrence of the scenario;

first determining, by the at least one computing device based on the received first events, a first duration of the first occurrence of the scenario, where the determined first duration indicates that the first occurrence of the scenario took longer than expected or desired;

second receiving, by the at least one computing device, second events related to a second occurrence of the scenario performed by the one or more computing devices and that are further related to performance of the one or more computing devices in performing the second occurrence of the scenario;

second determining, by the at least one computing device based on the received second events, a second duration of the second occurrence of the scenario, where the determined second duration indicates that the second occurrence of the scenario took longer than expected or desired;

collecting, by the at least one computing device in response to the first duration and the second duration both exceeding a threshold, extended information associated with the second occurrence of the scenario performed by the one or more computing devices and that is further related to performance of the one or more computing devices in performing the second occurrence of the scenario; and providing, by the at least one computing device, the collected extended information to an analyzer.

2. The method of claim 1 where the scenario involves a user interacting with software.

3. The method of claim 2 where the software is instrumented sufficient to generate events that are associated with occurrences of the scenario and that include the first events and the second events.

4. The method of claim 1 where the collected extended information comprises responsiveness data.

5. The method of claim 1 where the providing is via a network, and where the analyzer is separate from the at least one computing device.

6. The method of claim 1 where the collected extended information is different than or additional to the first events, the second events, and other information used to determine the first duration and the second duration.

7. At least one computer-readable storage device storing computer-executable instructions that, when executed by at least one computing device, cause the at least one computing device to perform actions comprising:

first receiving, by the at least one computing device, first events related to a first occurrence of a scenario performed by one or more computing devices and that are further related to performance of the one or more computing devices in performing the first occurrence of the scenario, where the at least one computing device comprises a hardware processor and memory;

first determining, by the at least one computing device based on the received first events, a first duration of the first occurrence of the scenario, where the determined first duration indicates that the first occurrence of the scenario took longer than expected or desired;

second receiving, by the at least one computing device, second events related to a second occurrence of the scenario performed by the one or more computing devices and that are further related to performance of the one or more computing devices in performing the second occurrence of the scenario;

second determining, by the at least one computing device based on the received second events, a second duration of the second occurrence of the scenario, where the determined second duration indicates that the second occurrence of the scenario took longer than expected or desired;

collecting, by the at least one computing device in response to the first duration and the second duration both exceeding a threshold, extended information associated with the second occurrence of the scenario performed by the one or more computing devices and that is further related to performance of the one or more computing devices in performing the second occurrence of the scenario; and providing, by the at least one computing device, the collected extended information to an analyzer.

8. The at least one computer-readable storage device of claim 7 where the scenario involves a user interacting with software.

9. The at least one computer-readable storage device of claim 8 where the software is instrumented sufficient to generate events that are associated with occurrences of the scenario and that include the first events and the second events.

10. The at least one computer-readable storage device of claim 7 where the collected extended information comprises responsiveness data.

11. The at least one computer-readable storage device of claim 7 where the providing is via a network, and where the analyzer is separate from the at least one computing device.

12. The at least one computer-readable storage device of claim 7 where the collected extended information is different than or additional to the first events, the second events, and other information used to determine the first duration and the second duration.

13. A system comprising at least one computing device and at least one program module together configured for performing actions comprising:

first receiving, by the at least one computing device, first events related to a first occurrence of a scenario performed by one or more computing devices and that are further related to performance of the one or more computing devices in performing the first occurrence of the scenario, where the at least one computing device comprises a hardware processor and memory;

first determining, by the at least one computing device based on the received first events, a first duration of the first occurrence of the scenario, where the determined first duration indicates that the first occurrence of the scenario took longer than expected or desired;

second receiving, by the at least one computing device, second events related to a second occurrence of the scenario performed by the one or more computing devices and that are further related to performance of the one or more computing devices in performing the second occurrence of the scenario;

second determining, by the at least one computing device based on the received second events, a second duration of the second occurrence of the scenario, where the determined second duration indicates that the second occurrence of the scenario took longer than expected or desired;

collecting, by the at least one computing device in response to the first duration and the second duration both exceeding a threshold, extended information associated with the second occurrence of the scenario performed by the one or more computing devices and that is further related to performance of the one or more computing devices in performing the second occurrence of the scenario; and providing, by the at least one computing device, the collected extended information to an analyzer.

14. The system of claim 13 where the scenario involves a user interacting with software that is instrumented sufficient to generate events that are associated with occurrences of the scenario and that include the first events and the second events.

15. The system of claim 13 where the collected extended information comprises responsiveness data.

16. The system of claim 13 where the providing is via a network, and where the analyzer is separate from the at least one computing device.

17. The system of claim 13 where the collected extended information is different than or additional to the first events, the second events, and other information used to determine the first duration and the second duration.

* * * * *